(12) United States Patent
Kroese et al.

(10) Patent No.: US 12,038,533 B2
(45) Date of Patent: Jul. 16, 2024

(54) FILTER FOR REDUCING OPTICAL CROSS-TALK

(71) Applicant: ams AG, Premstaetten (AT)

(72) Inventors: Matt Kroese, AE Eindhoven (NL); Gerhard Eilmsteiner, AE Eindhoven (NL); Josef Kriebernegg, AE Eindhoven (NL); Desislava Oppel, AE Eindhoven (NL)

(73) Assignee: ams AG, Premstaetten (AT)

( * ) Notice: Subject to any disclaimer, the term of this patent is extended or adjusted under 35 U.S.C. 154(b) by 885 days.

(21) Appl. No.: 17/057,631

(22) PCT Filed: May 20, 2019

(86) PCT No.: PCT/EP2019/062959
§ 371 (c)(1),
(2) Date: Nov. 20, 2020

(87) PCT Pub. No.: WO2019/224150
PCT Pub. Date: Nov. 28, 2019

(65) Prior Publication Data
US 2021/0199768 A1    Jul. 1, 2021

(51) Int. Cl.
*G01C 3/08* (2006.01)
*G01S 7/481* (2006.01)
*G01S 17/04* (2020.01)

(52) U.S. Cl.
CPC .......... *G01S 7/4813* (2013.01); *G01S 7/4814* (2013.01); *G01S 7/4816* (2013.01); *G01S 17/04* (2020.01)

(58) Field of Classification Search
CPC .... G01S 7/4813; G01S 7/4814; G01S 7/4816; G01S 17/04
See application file for complete search history.

(56) References Cited

U.S. PATENT DOCUMENTS

2011/0122071 A1* 5/2011 Powell ............... G06F 3/041
345/173
2011/0204233 A1   8/2011 Costello et al.
(Continued)

FOREIGN PATENT DOCUMENTS

| CN | 1689255 A | 10/2005 | |
|---|---|---|---|
| CN | 103808416 A | 5/2014 | |
| KR | 20160135179 A | * 11/2016 | ........... G06F 3/0421 |

OTHER PUBLICATIONS

Cn2019800486114, "Office Action", May 25, 2023, 15 pages.
PCT/EP2019/062959 International Search Report and Written Opinion, mailed Aug. 2, 2019; 13 pages.

*Primary Examiner* — Mark Hellner
(74) *Attorney, Agent, or Firm* — VIERING, JENTSCHURA & PARTNER mbB

(57) ABSTRACT

An optical device (306) includes an internal cavity and an emitter (102) disposed in the internal cavity (210). The emitter is operable to emit a first light wave (220). The optical device also includes a detector (104) disposed in the internal cavity. The detector is operable to detect a second light wave (225) that is based on the first light wave. The second light wave is susceptible to being coupled with an undesired light wave (235) that is based on the first light wave. The optical device further includes an interference filter (310) disposed on the detector. The interference filter has a filter property that causes the interference filter to attenuate the interfering light wave.

19 Claims, 7 Drawing Sheets

(56) References Cited

U.S. PATENT DOCUMENTS

| | | | |
|---|---|---|---|
| 2012/0132809 A1* | 5/2012 | Findlay | G01J 1/0271 |
| | | | 250/353 |
| 2013/0292706 A1 | 11/2013 | Costello et al. | |
| 2013/0327931 A1* | 12/2013 | Hsu | H01L 31/02005 |
| | | | 250/237 R |
| 2016/0006505 A1 | 1/2016 | Hase et al. | |
| 2016/0025855 A1 | 1/2016 | Camarri et al. | |
| 2016/0216382 A1 | 7/2016 | Snoeren | |

* cited by examiner

350

```
┌─────────────────────────────────────────────────────────────────────┐
│ AN EMITTER, POSITIONED IN AN OPTICAL DEVICE, EMITS A FIRST LIGHT WAVE│
│   THAT ALSO CAUSES AN UNDESIRED LIGHT WAVE IN THE OPTICAL DEVICE    │
│                                                                 352 │
└─────────────────────────────────────────────────────────────────────┘
                                    ↓
┌─────────────────────────────────────────────────────────────────────┐
│  A DETECTOR, POSITIONED IN THE OPTICAL DEVICE, DETECTS A SECOND LIGHT│
│  WAVE THAT IS BASED ON THE FIRST LIGHT WAVE, THE SECOND LIGHT WAVE IS│
│     SUSCEPTIBLE TO BEING COUPLED WITH THE UNDESIRED LIGHT WAVE      │
│                                                                 354 │
└─────────────────────────────────────────────────────────────────────┘
                                    ↓
┌─────────────────────────────────────────────────────────────────────┐
│   AN INTERFERENCE FILTER, POSITIONED ON THE DETECTOR, FILTERS THE   │
│ UNDESIRED LIGHT WAVE BY ATTENUATING THE UNDESIRED LIGHT WAVE BASED  │
│         ON A FILTER PROPERTY OF THE INTERFERENCE FILTER             │
│                                                                 356 │
└─────────────────────────────────────────────────────────────────────┘
```

Fig. 3B

FILTER FOR REDUCING OPTICAL CROSS-TALK

CROSS-REFERENCE TO RELATED APPLICATIONS

This application is a 371 U.S. National Phase of PCT International Patent Application No. PCT/EP2019/062959, filed on May 20, 2019, which claims benefit and priority to U.S. provisional patent application Nos. 62/676,395, filed on May 25, 2018, and 62/809,849, filed on Feb. 25, 2019; the disclosures of which are each incorporated by reference herein in their entirety for all purposes.

FIELD

This specification relates to filters for optical sensing devices.

BACKGROUND

Integrated circuits (ICs) may include various components for use in sensing apparatus such as optical sensing devices. One example of such an IC uses a package having a light emitter and a photodetector in order to produce and detect light. More specifically, light may be produced by the emitter and be reflected from the object back to the photodetector. The photodetector produces a representation (e.g., an electrical signal) of the detected light. The electrical signal or representation may be processed and used as desired to obtain information about the object. Sensing apparatus, such as devices for proximity sensing, presence detection, motion detection, and color detection, frequently use such optical sensing methods to obtain information about an object. The information that is obtained can include a proximity or approximate distance of the object relative to the sensing apparatus.

For example, in proximity sensing, an infrared (IR) vertical cavity surface emitting laser (VCSEL) may be used to emit photons that reflect off of an object and are detected by an IR sensor/detector of an optical proximity sensing device. When there is an object within a detectable distance from a sensing device that includes the IR VCSEL and the IR detector, the sensing device measures the reflected signal. The device uses the reflected signal to determine a proximity readout that may be proportional to the measured light signal intensity of the reflected signal. In some cases, signal characteristics of the reflected light are detected, measured, and processed based on a strength of the signal emitted from the VCSEL. Ideally, only the reflected light from the object is detected by the sensing device. However, often times the sensor detects light other than the reflected light, which may result in distorted measurement readings.

SUMMARY

This document describes an optical sensing device that includes an internal cavity and an emitter disposed in the internal cavity. The emitter is operable to emit a first light wave. The optical device also includes a detector disposed in the internal cavity. The detector is operable to detect a second light wave that is based on the first light wave emitted by the emitter. The second light wave is susceptible to being coupled with an undesired light wave that is also based on the first light wave emitted by the emitter. The optical device further includes an interference filter positioned or disposed on the detector. The interference filter is operable to have a particular filter property that causes the interference filter to attenuate the undesired light wave.

One aspect of the subject matter described in this specification can be embodied in an optical device, including: an emitter disposed in the optical device, the emitter being operable to emit a first light wave; a detector disposed in the optical device, the detector being operable to detect a second light wave that is based on the first light wave, wherein the second light wave detectable by the detector is susceptible to being coupled with an undesired light wave that is based on the first light wave; and an interference filter disposed on the detector, the interference filter having a filter property to cause the interference filter to attenuate the undesired light wave.

These and other implementations can each optionally include one or more of the following features. For example, in some implementations, the filter property is operable to cause the interference filter to attenuate the undesired light wave based on an angle of reflection of the undesired light wave, the angle of reflection of the undesired light wave being relative to a surface of the detector.

In some implementations, the filter property is operable to cause the interference filter to attenuate the undesired light wave based on the undesired light wave having an angle of reflection that corresponds to a first angle of incidence of the first light wave, wherein the first angle of incidence of the first light wave is relative to the emitter; and the undesired light wave has an angle of reflection relative to the detector that corresponds to the first angle of incidence of the first light wave.

In some implementations, the filter property is operable to permit the second light wave to be detected by the detector based on the second light wave having a second angle of reflection; and the second angle of reflection of the second light wave is relative to the detector and is different than the first angle of incidence of the first light wave.

In some implementations, the first angle of incidence of the first light wave is greater than 45 degrees relative to a central axis of the emitter; and the second angle of reflection of the second light wave is between zero degrees relative to the central axis of the detector and 30 degrees relative to the central axis of the detector. In some implementations, the filter property of the interference filter is operable to cause the interference filter to attenuate one or more light wave signals that have an angle of reflection relative to the detector that corresponds to the first angle of incidence of the first light wave.

In some implementations, the filter property of the interference filter is based on a composition of layers that form the interference filter. In some implementations, the filter property of the interference filter represents a dynamic angular response of the interference filter. In some implementations, the dynamic angular response of the interference filter changes based on an angle of incident light; and the angle of incident light is relative to a surface of the detector.

In some implementations, the dynamic angular response of the interference filter has a change of approximately −1 nanometer in response to a one degree change to the angle of incident light. In some implementations, the interference filter is a passband filter with a particular transmission passband; and the transmission passband represents a range of wavelengths that are not attenuated by the interference filter.

In some implementations, the passband filter is operable such that the transmission passband spectrally shifts in response to an increase in the angle of incident light. In some implementations, the interference filter is a passband filter; and the optical device is a proximity sensor operable to detect a proximity of a target object relative to the optical device. In some implementations, the undesired light wave that is based on the first light wave is a result of the first light wave interacting with a portion of an internal cavity of the optical device. In some implementations, the first light wave and the second light wave have the same wavelength.

Other implementations of this disclosure and other aspects include corresponding systems, apparatus, and computer programs configured to perform the actions of the methods and encoded on computer storage devices. A computing system of one or more computers or hardware circuits can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The subject matter described in this specification can be implemented to realize one or more of the following advantages. The described techniques leverage a filter property of an interference filter to reduce optical cross-talk caused by undesired light waves at an optical sensing device. By leveraging the filter property of the interference filter, an improved optical device can be designed and manufactured, in some instances, without additional filtering mechanisms, such as costly optical barriers or optical isolators. By obviating the need for additional filtering mechanisms, the improved optical device can achieve advantages such as smaller device packaging and reduced production costs.

Other aspects, features and advantages will become apparent from the following detailed description, the accompanying drawings, and the claims.

BRIEF DESCRIPTION OF THE DRAWINGS

FIG. 3B shows an example process for reducing optical cross-talk using an interference filter.

DETAILED DESCRIPTION

Optical sensors can include both an emitter and detector in a device package. The device package generally represents a physical device structure of an optical sensor or optical sensing device. The device package defines an internal cavity where the emitter and detector can be positioned.

In general, the emitter emits a signal that interacts with a target object outside the package, which reflects a signal detectable by the detector. In some implementations, the optical sensing device is a proximity sensor, and the reflected signal detected by the detector is used to determine a proximity of a target object (e.g., a person's head) relative to the optical device. For example, the optical device may be disposed in a mobile/smartphone device, and the detected reflected signal is processed at the mobile device to determine whether the smartphone is positioned adjacent a person's ear.

Each of the emitted signal and the reflected signal can be light waves, such as emitted and reflected rays of IR light, respectively. The emitted light wave signal may have certain power and spectral characteristics that causes undesired light waves in the internal cavity of the device package. The undesired signal can couple with the reflected signal that is detectable by the detector and can degrade the optical device's ability to detect the proximity of the target object accurately and reliably. The undesired signal may be referred to, alternatively, as crosstalk, optical crosstalk, system crosstalk, or noise. Conventional optical devices may include an optical barrier (sometimes called an optical isolator) disposed between the emitter and detector to reduce optical crosstalk and increase the system signal-to-noise or signal-to-crosstalk) ratio. However, optical barriers can be costly to install, may not sufficiently reduce the undesired light waves at the detector, and tend to increase the size and complexity of the device package.

This document describes techniques for improved filtering of undesired light waves that may degrade a detecting function of an optical sensing device. In particular, techniques are described for effectively leveraging a filter property of an interference filter to attenuate or block undesired light waves or system crosstalk from degrading the detecting function of a detector, e.g., a photodiode that is disposed adjacent an emitter in an internal cavity of an optical device.

Figure 1:
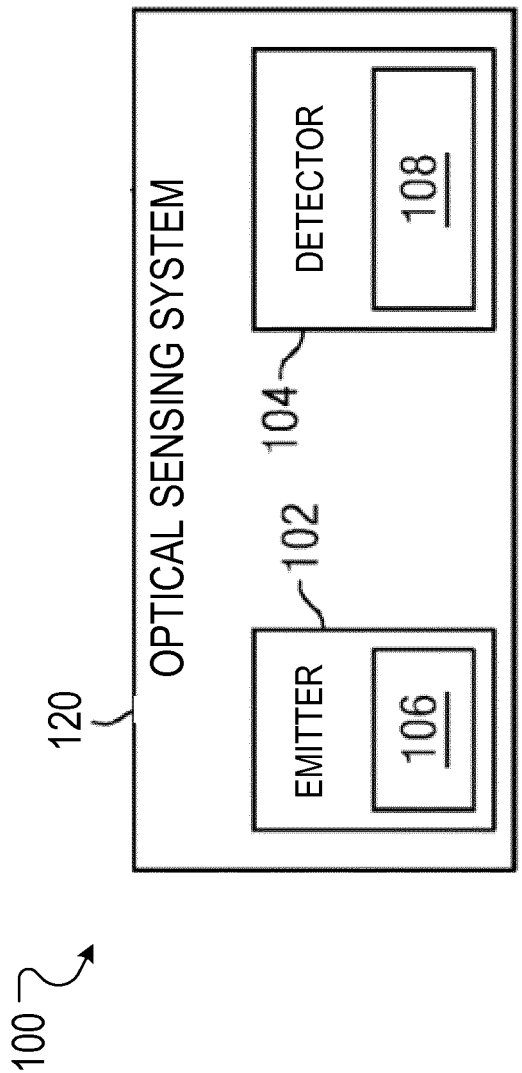
FIG. 1 is a block diagram of an example optical sensing system.

FIG. 1 is a block diagram of an example optical sensing system 100. System 100 can represent an integrated circuit (IC) or an optical device, such as one or multiple optical sensors or optical sensing devices. System 100 includes an emitter 102, such as a VCSEL, and a detector 104, such as a photodetector. In some cases, detector 102 is alternatively referred to as a sensor and may be a photodiode operable to sense (e.g., detect) light waves at a surface section of detector 104. Emitter 102 can be operable, for example, to generate a signal of a particular wavelength, and the detector 104 can be a sensor operable to sense the signal produced by the emitter 102. The emitter 102 and detector 104 may be disposed in, or otherwise located in, an optical device represented by system 100.

The emitter 102 can be configured to produce visible or non-visible light of a desired wavelength. For example, the emitter 102 can produce light waves that have a wavelength in the near-infrared (NIR) spectrum in the range of 750 nanometers (nm) to 1400 nm, such as for a proximity sensing application. As described in more detail below, in an example implementation, the emitter 102 produces light, and the detector 104 incorporates a filter to minimize the detector's response to light other than wavelengths produced by the emitter 102.

The emitter 102 can be fabricated directly onto an IC of system 100 or may include an IC chip or other modular component that is added to the IC of system 100 during or after fabrication of the IC. The emitter 102 may be a single emitter or may represent multiple emitters (e.g., an array of emitters). In some implementations, the emitter 102 is a light emitting diode (LED). The detector 104 is configured to detect light of the wavelength produced by the emitter 102 (e.g., in the range of 850 nm to 940 nm). The detector 104 also may be fabricated directly onto an IC of system 100 or may include an IC chip or other modular component that is added to the IC of system 100 during or after fabrication of the IC. The detector 104 may be a single detector or may represent multiple detectors (e.g., an array of detectors).

The emitter 102 and detector 104 can be spaced apart by a particular distance. This can distance separate a point on each of the emitter 102 and detector 104. In some implementations, the distance separates a center point of a projection or emitting portion 106 of the emitter 102 and a detection or sensing portion 108 of the detector 104. The projection portion 106 can include circuitry of the emitter 102 that enables the emitter to generate an example light wave or related optical signal. Similarly, the detection portion 108 can include circuitry of the detector 104 that enables the detector to detect an example light wave or optical signal.

In some implementations, system 100 is an optical sensor that includes both an emitter 102 and a detector 104 in a single device package 120. The device package 120 generally represents a physical device structure of an optical sensor or optical sensing device. As described in more detail below, the device package 120 can include or define an internal space (e.g., an internal cavity) where the emitter and detector can be positioned.

Figure 2A:
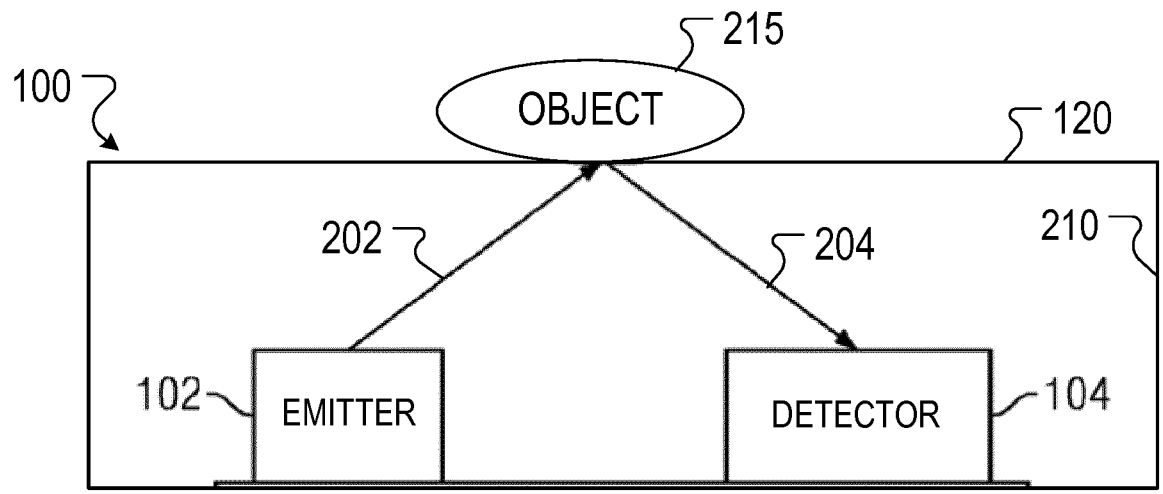
FIG. 2A is a block diagram of an example optical device that emits and detects a signal for sensing a target object.

FIG. 2A is a block diagram of an example optical device(s) represented by system 100. For purposes of example, system 100 is described in the context of a proximity sensing application. However, emitter 102 and detector 104 may be used for other applications, including presence detection, motion detection, color detection, and other related applications in which an emitted signal is later detected and processed or analyzed. In the implementation of FIG. 2A, the system 100 is an optical device that emits a signal for sensing a target object. The signal can correspond to an example light wave 202 that is associated with a reflected light wave 204.

As noted above, the optical device can include both the emitter 102 and detector 104 in a device package that defines an internal cavity 210. The light wave 202 emitted by emitter 102 interacts with a target object 215 to cause the reflected light wave 204. The target object 215 is external to the device package 120. In this manner, the emitted light wave 202 exits the internal cavity 210 of the optical device after being emitted for sensing the target object 215, and the reflected light wave 204 enters the internal cavity 210 of the optical device in response to the emitted light wave 202 interacting with the target object 215.

Figure 2B:
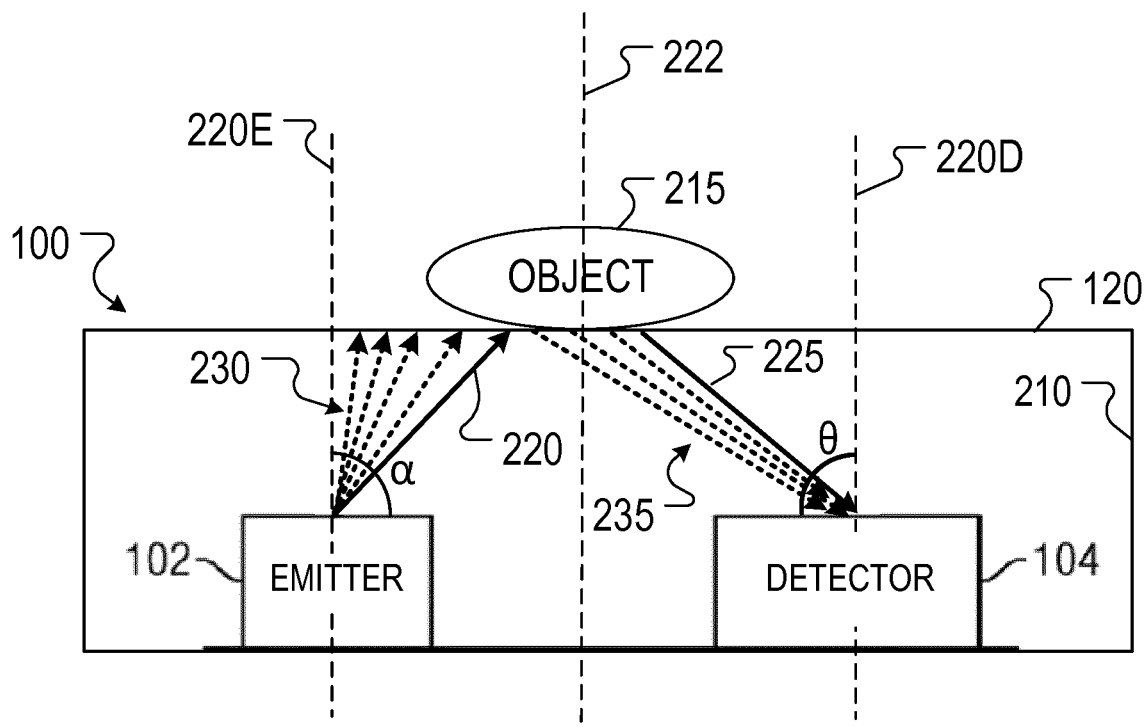
FIG. 2B is a block diagram of an example optical device emitting a signal that results in cross-talk at the optical device.

Referring now to FIG. 2B, in this implementation an optical device(s) represented by system 100 emits a signal corresponding to a light wave 220. The light wave 220 is emitted for sensing target object 215 but causes one or more light waves 225 to be reflected by the optical device. As described herein, the light wave 220 may have signal characteristics or attributes 230 that result in cross-talk at the optical device of system 100. For example, the emitted light wave 220 may have certain power and/or spectral attributes 230 that cause undesired light waves 235 to occur in the internal cavity 210 of the device package 120. The undesired light waves are based on the emitted light wave 220 and can result in cross-talk at the optical device.

In some implementations, the undesired light waves 235 occur when one or more light waves 220 reflect off a portion of the device package 120 that forms the optical device. For example, undesired light waves 235 can occur when light wave 220 reflects off an inner wall that may be associated with the internal cavity 210 of the device package 120. In other examples, undesired light waves 235 can occur when light wave 220 reflects off a glass surface of the device package 120. The emitted light wave 220 can have a particular angle of incidence, α. Similarly, the reflected light wave 225 and the undesired light waves 235 can each have a respective angle of reflection, θ.

The angle of incidence α of the emitted light wave 220 can be measured relative to line 220E and a planar surface of emitter 102, while the angle of reflection θ of the reflected light wave 225 and the undesired light waves 235 can be measured relative to line 220D and a planar surface of emitter 104. In alternative implementations, the angle of incidence α and the angle of reflection θ can be measured between respective light waves 220, 225 and a line 222 that is perpendicular to a planar surface extending between a surface of emitter 102 and detector 104.

In some implementations, the lines 220E, 220D are features used to illustrate a particular "on-axis" or "off-axis" characteristic of certain angular bands of light that are detectable by detector 104. For example, the reflected light wave 225 can have an angle of reflection θ that is between 0 degrees and 30 degrees relative to line 220D and a surface of detector 104 and is referred to herein as "on-axis" light. Alternatively, an undesired light wave 235 can have an angle of reflection θ that is greater than 45 degrees relative to line 220D and a surface of detector 104 and is referred to herein as "off-axis" light.

Figure 3A:
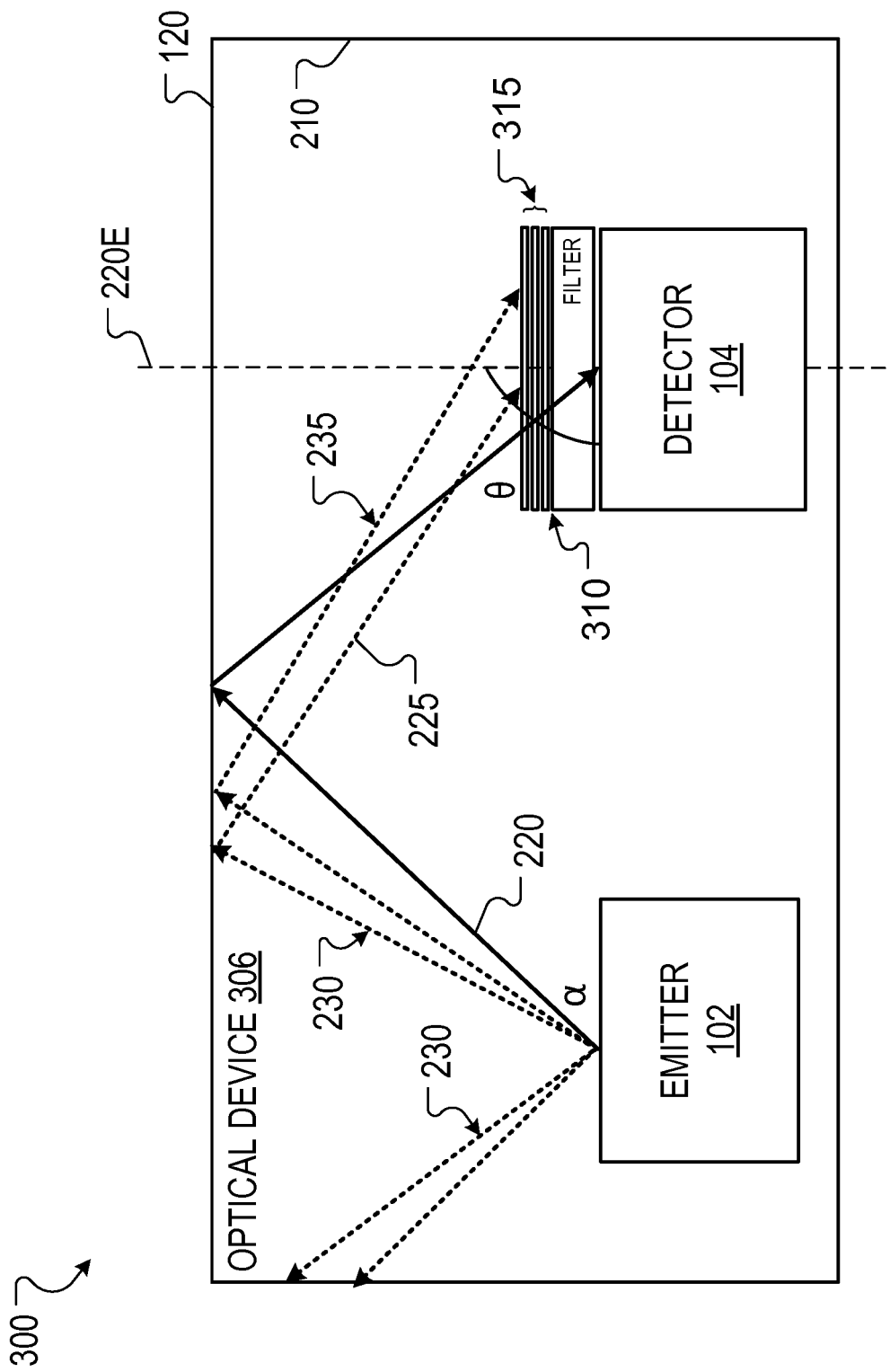
FIG. 3A is a block diagram of an example optical sensing device and an interference filter for reducing optical cross-talk.

FIG. 3A is a block diagram of an example optical sensing system 300. System 300 can represent one or more optical devices 306 that leverage the spectral transmission's angular dependency property of an interference filter shift 310 to reduce optical cross-talk caused by undesired light waves 235. In some cases, the spectral transmission's angular dependency property corresponds to a filter property of the interference filter. Further, by leveraging the filter property of the interference filter 310, optical device 306 can be designed and manufactured, in some cases, without additional filtering mechanisms, such as optical barriers or optical isolators. By obviating the need for additional filtering mechanisms, optical device 306 can achieve advantages such as smaller device packaging and reduced production costs.

Interference filter 310 can be disposed on detector 104. In some implementations, interference filter 310 is placed on an example glass portion of detector 104 or directly on a silicon substrate that forms an IC of detector 104, such as an IC of a photodiode or other photodetector.

Interference filter 310 can be formed using at least two different materials that are particularly suited for attenuating signals that correspond to light waves having a certain angle of reflection θ. For example, each of the respective materials can have a different index of refraction that cooperates to define a filter property of the interference filter 310. The filter property is operable to cause the interference filter 310 to attenuate the undesired light waves 235 based on an angle of reflection θ of the undesired light waves 235. The filter property of the interference filter 310 can be based on a composition of layers 315 that form the interference filter.

The different materials of the interference filter 310 can be associated with respective layers 315 of the interference filter. Each of the respective layers 315 can have a particular thickness, and the layers may be arranged in a stacked configuration. In some implementations, a thickness of the materials at each layer can be varied or adjusted so as to control an amount of light that is received or detected by the detector 104 and to control an amount of undesired light that is blocked from detection by the detector 104. In some cases, the interference filter 310 can have up to fifty layers 315 of the light refracting material.

The interference filter 310 can be an optical filter that selectively passes or transfers light of different wavelengths and different angles of reflection or incidence. For example, the interference filter 310 is operable to pass specific wavelength bands of light detectable by the detector 104. The interference filter 310 can have characteristics of a bandpass filter that has a particular transmission passband. The transmission passband represents a range of wavelengths that are not attenuated by the interference filter. In some implementations, the interference filter 310 may also have high-pass filter, low-pass filter, or Gaussian filter characteristics. An example passband property of the interference filter 310 can be designed around light waves that hit the filter 310 at 0 degrees. In other words, the interference filter 310 can be designed to pass light waves through the filter layers 315 and to a surface of the detector 104, when the light waves arrive at an angle of 0 degrees relative to a surface of detector 104. Such light waves can represent the on-axis light described above.

In some implementations, the interference filter 310 is operable such that a transmission passband of the filter shifts in response to an increase in the angle of incident light. This spectral shifting of the filter's transmission passband can be characterized as a filter property that represents a dynamic angular response of the interference filter 310 (e.g., based on the transmission's angular dependency property of the interference filter 310). The dynamic angular response of the interference filter 310 is operable to change based on an angle of incident light. For example, the angle of incident light can correspond to the angle of reflection θ of the light waves 235, where the angle is measured relative to line 220D and a surface section of the detector 104. The dynamic angular response of the interference filter 310 can change by approximately −1 to −2 nanometer (nm) in response to a one degree change to the angle of incident light.

For example, as the angle of reflection θ of the light waves 235 increases, the optical filter properties of the interference filter 310 causes a corresponding spectral shift in the transmission passband. In some implementations, the transmission passband spectrally shifts towards lower wavelengths in order to block cross-talk signals (i.e., undesired light waves 235) that have angles of reflection θ which are, e.g., greater than 40 degrees. This optical filter property of interference filter 310 is particularly suited for blocking or attenuating undesired light waves 235 because undesired light waves 235 that reach a detector 104 at incident angles greater than, e.g., 45 degrees, correspond to cross-talk signals.

FIG. 3B shows an example process 350 for reducing optical cross-talk using an interference filter. In some implementations, process 350 is performed using optical device 306 of system 300 described above. Referring now to the process 350, an emitter disposed in an optical device emits a first light wave (352). The first light wave causes an undesired light wave in the optical device. For example, emitter 102 of optical device 306 generates a signal that corresponds to light wave 220. The emitter 102 can be a VCSEL that has a narrow spectral power density (SPD), e.g., an SPD that spans a wavelength band of 5 nm to 15 nm.

A detector disposed in the optical device detects a second light wave that is based on the first light wave (354). The second light wave detectable by the detector is susceptible to being coupled with an undesired light wave caused by the first light wave. For example, detector 104 detects reflected light wave 225 in response to the VCSEL light emitted by emitter 102 reflecting off target object 215. In this implementation, reflected light wave 225 is susceptible to being coupled with undesired light waves 235. For example, the SPD of emitter 102 causes light wave 220 to have certain power and/or spectral attributes 230 that cause undesired light waves 235 to occur at optical device 306.

An interference filter disposed on the detector is used to filter the undesired light wave caused by the first light wave (356). Filtering the undesired light wave includes attenuating the undesired light wave based on a filter property of the interference filter. For example, interference filter 310 has an optical filter property that is operable to cause the interference filter 310 to attenuate the undesired light waves 235 based on an angle of reflection of the undesired light waves 235 that is measured relative to a surface section of the detector 104.

In some implementations, the emitted light wave 220 has an angle of incidence relative to the emitter 102 and the undesired light wave 235 has an angle of reflection θ relative to the detector 104 that corresponds to the angle of incidence of the emitted light wave 220. The filter property is operable to cause the interference filter 310 to attenuate the undesired light wave 235 based on the undesired light wave 235 having an angle of reflection θ that corresponds to the angle of incidence of the light wave 220. In a related manner, the reflected light wave 225 has an angle of reflection θ relative to the detector 104 that is different from the angle of incidence of the emitted light wave 220. The filter property of the interference filter 310 is operable to permit (or pass) the reflected light wave 225 to be detected by the detector 104 based on the reflected light wave 225 having a wavelength and angle of reflection θ that is within a transmission passband of the interference filter 310.

In some implementations, optical device 306 is part of a sensing system 300 installed in a host device, such as a mobile smartphone, tablet, in-ear headphones, wearable devices, or other electronic device. In such implementations, the advantages of optical device 306 that pertain to reducing, attenuating, or blocking cross-talk can translate to improved proximity sensing features as well as other detection features at the host device. For example, the optical device 306 may be integrated in a host device, and the reflected light wave signal 225 is processed at the host device to more accurately determine whether the host device is positioned at an ear of a person's head.

In some implementations, the host device receives signals from the detector and uses one or more processing devices to adjust a feature of the host device in response to receiving the signals from the detector. For example, the host device can adjust a brightness of a display screen integrated at the host device, turn off the display screen, or cause the host device to transition from a locked operating state to an unlocked operating state.

Figure 4:
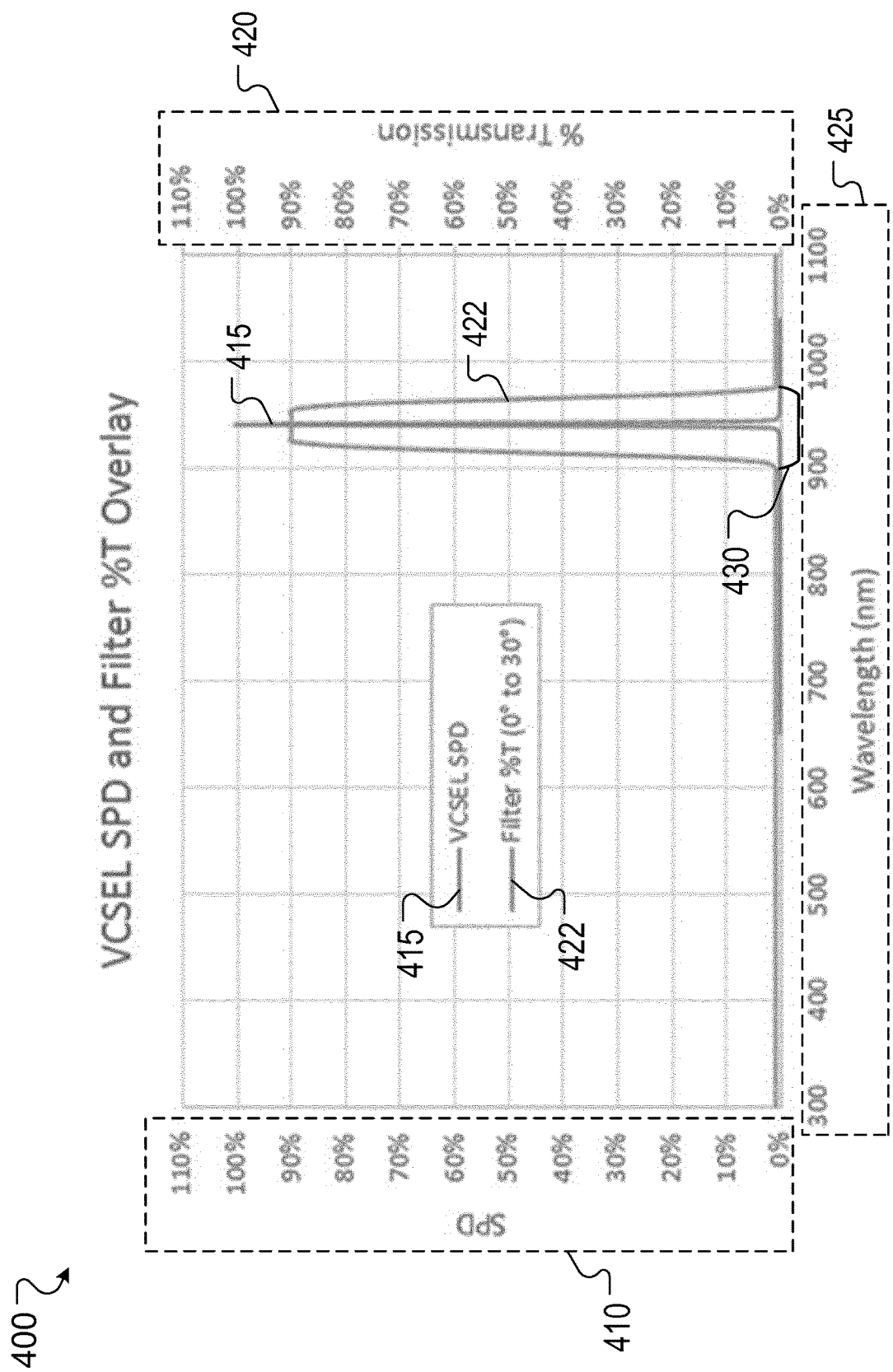
FIG. 4 shows a first set of graphical data indicating a respective property of a specific emitter and a specific interference filter, at a particular angle of incidence.

FIG. 4 shows an example graph 400 that includes a first set of graphical data indicating a respective property of a specific emitter and a specific interference filter, at a particular angle of incidence. Graph 400 includes: i) an SPD axis 410 for indicating spectral power density of a VCSEL 415; ii) a percent transmission axis 420 for indicating percent transmission 422 of reflected light of VCSEL 415 (e.g., with θ=0 degrees to 30 degrees) that is permitted to reach the detector 104; and iii) a wavelength axis 425 for indicating wavelengths of one or more light waves. The emitted VCSEL light 415 can correspond to emitted light wave 220, such as a light wave of a VCSEL that has a narrow wavelength energy band (e.g., 5 nm-10 nm).

As discussed above, the interference filter 310 is operable to pass specific wavelength bands of light for detection by the detector 104. The interference filter 310 can have a transmission passband 430 that represents a range of wavelengths that are not attenuated by the interference filter. In the implementation of FIG. 4, the range of wavelengths of the transmission passband spans approximately 900 nm to 950 nm. In some implementations, the on-axis light (e.g., reflected light wave 225) detectable by detector 104 will have a wavelength that falls within transmission passband 430 as well as an angle of reflection θ that is between 0 degrees and 30 degrees. As indicated by graph 400, in some implementations, the emitted light wave 220 and the reflected light wave 225 have the same wavelength.

Figure 5:
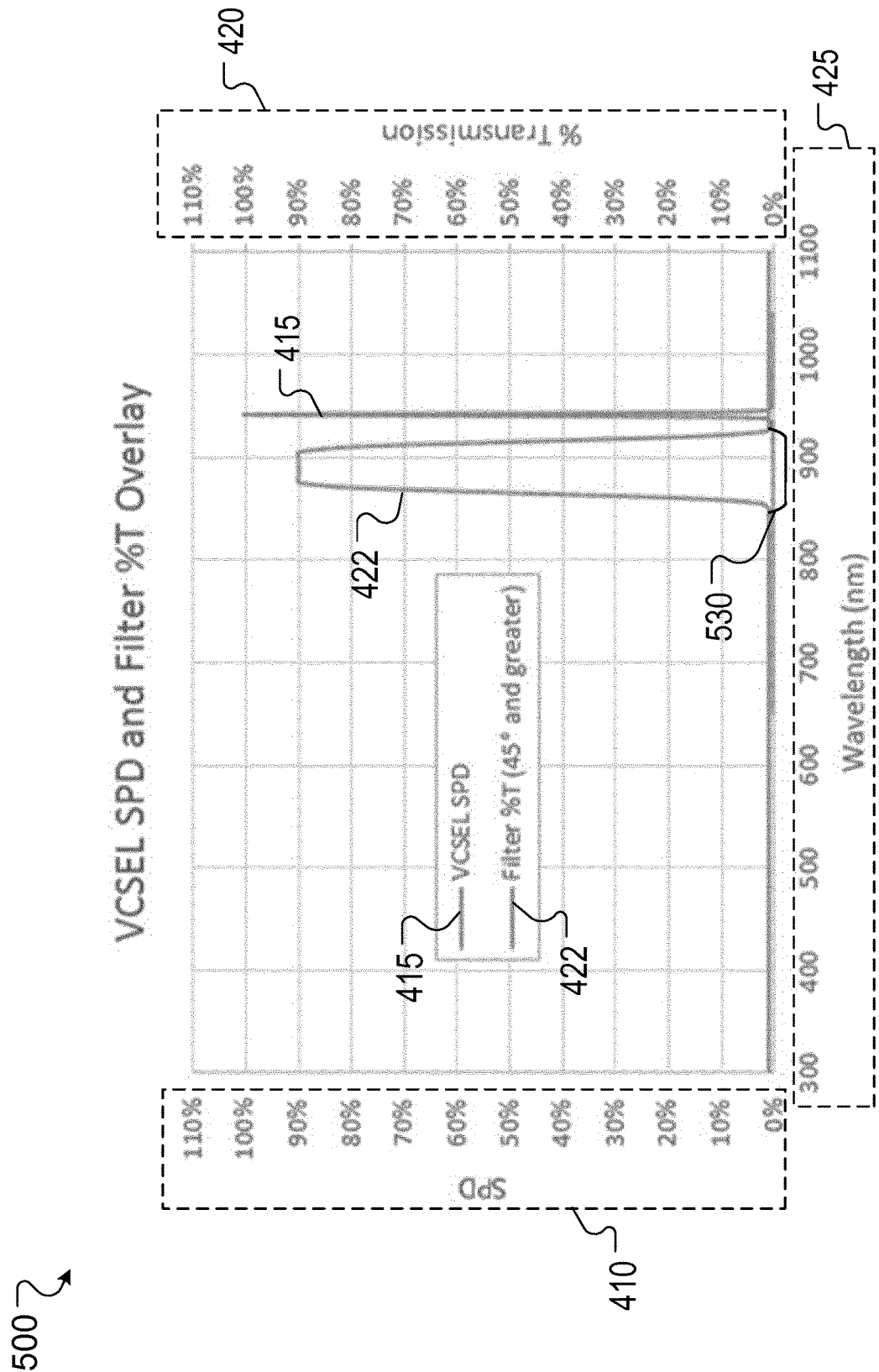
FIG. 5 shows a second set of graphical data indicating a respective property of a specific emitter and a specific interference filter, at a particular angle of incidence.

FIG. 5 shows an example graph 500 that includes a second set of graphical data indicating a respective property of a specific emitter and a specific interference filter, at a particular angle of incidence. At graph 500, percent transmission axis 420 indicates percent transmission 422 of reflected VCSEL light 415 (e.g., with θ=greater than 45 degrees) that is permitted to reach the detector 104. As noted above, a transmission passband of the interference filter 310 spectrally shifts in response to an increase in the angle of incident light. In the implementation of FIG. 5, the interference filter 310 has a transmission passband 530 that has spectrally shifted approximately −45 degrees relative to the transmission passband 430 of FIG. 4. For example, if the interference filter 310 has a transmission passband that is 60 nm wide and centered on the wavelength associated with the VCSEL SPD, then an angle of incident light that produces a −30 nm spectral shift begins to cut off the signal from the VCSEL.

Figure 6:
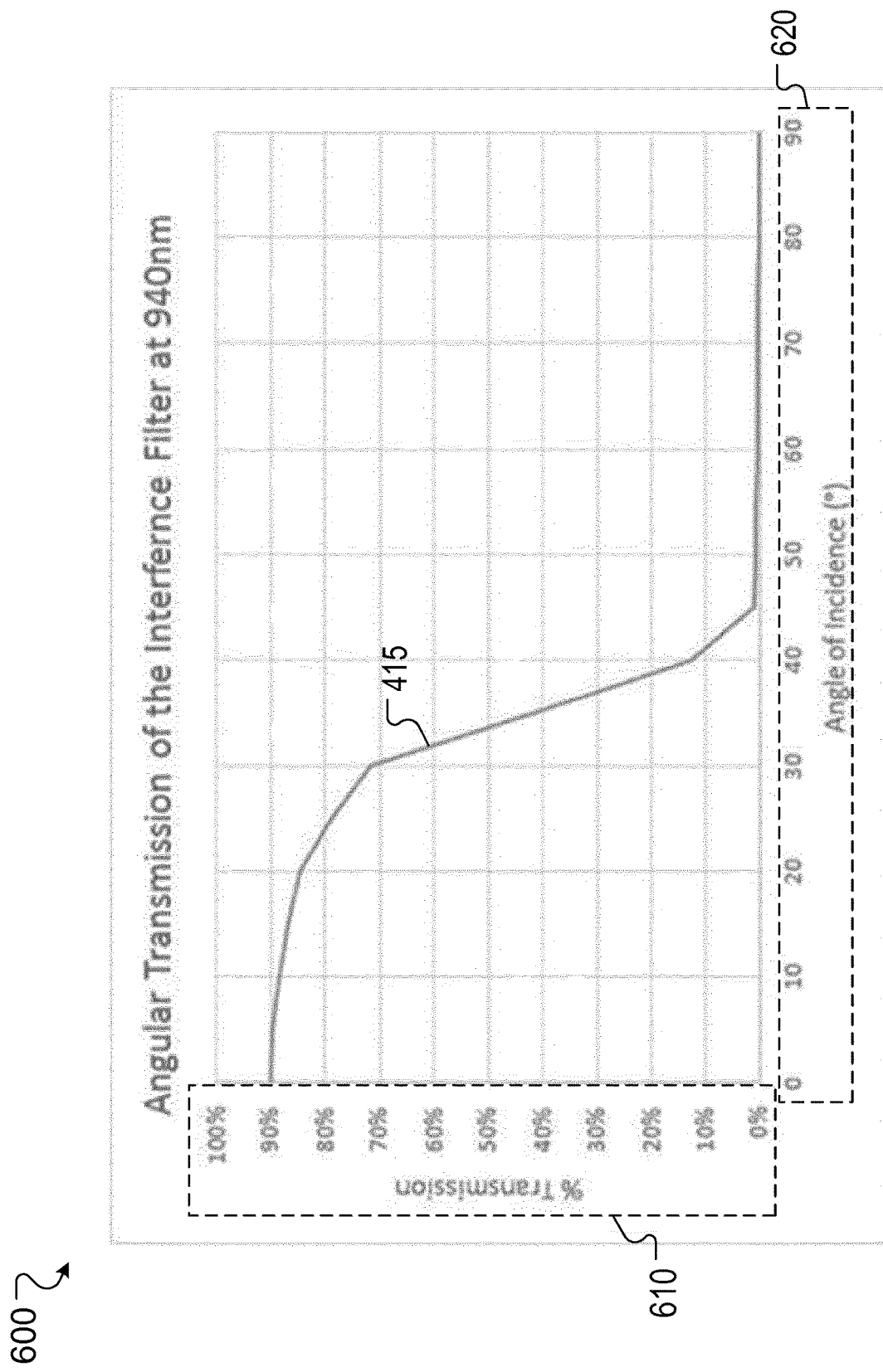
FIG. 6 shows graphical data indicating Angular Transmission of 940 nm light for the interference filter example of FIG. 4 and FIG. 5.

FIG. 6 shows an example graph 600 that includes graphical data indicating Angular Transmission of the interference filter 310 for 940 nm light. In some implementations, the interference filter 310 corresponds to the interference filter that is associated with graphical data of FIG. 4 and FIG. 5. Graph 600 includes: i) a percent transmission axis 610 for indicating percent transmission of reflected VCSEL light 415 (e.g., with θ=0 degrees to 45 degrees) that is permitted to reach the detector 104 and ii) an angle of incidence axis 620 for indicating angles of incident of light having a wavelength of 940 nm. Graph 600 can indicate percent transmission of reflected VCSEL light 415 (e.g., with θ=greater than 45 degrees) that is permitted to reach the detector 104.

Various implementations of the systems and techniques described here can be realized in digital electronic circuitry, integrated circuitry, specially designed ASICs, computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs, also known as programs, software, software applications or code, include machine instructions for a programmable processor, and can be implemented in a high-level procedural and/or object-oriented programming language, and/or in assembly/machine language. In some implementations, the computer programs are used by a controller of a host device (e.g., a smartphone or tablet). For example, the controller uses the programs to control operation of an emitter disposed in the host device and to process signals generated by a detector disposed in the host device. The signals generated by the detector are processed in response to the detector receiving reflected light corresponding to light waves emitted by the emitter.

As used herein, the terms "machine-readable medium" "computer-readable medium" refers to any computer program product, apparatus and/or device, e.g., magnetic discs, optical disks, memory, Programmable Logic Devices (PLDs) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described here can be implemented in a computing system that includes a back-end component, e.g., as a data server, or that includes a middleware component such as an application server, or that includes a front-end component such as a client computer having a graphical user interface or a Web browser through which a user can interact with an implementation of the systems and techniques described here, or any combination of such back-end, middleware, or front-end components. The components of the system can be interconnected by any form or medium of digital data communication such as, a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. Further, while this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment.

Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products. Accordingly, other implementations are within the scope of the following claims.

What is claimed is:

1. An optical device, comprising:
   an emitter disposed in the optical device, the emitter being operable to emit a first light wave;
   a detector disposed in the optical device, the detector being operable to detect a second light wave that is based on the first light wave;
   and an interference filter disposed on the detector, the interference filter having a filter property to cause the interference filter to attenuate an undesired light wave,
   wherein the filter property of the interference filter is based on a plurality of layers that form the interference filter,
   wherein each layer of the plurality of layers has a thickness;
   wherein the thickness of the each layer of the plurality of layers controls an amount of the undesired light wave that is blocked from detection by the detector.

2. The optical device of claim 1, wherein:
   the filter property is operable to cause the interference filter to attenuate the undesired light wave based on an angle of reflection of the undesired light wave, the angle of reflection of the undesired light wave being relative to a surface of the detector.

3. The optical device of claim 1, wherein:
   the filter property is operable to cause the interference filter to attenuate the undesired light wave based on the undesired light wave having an angle of reflection that corresponds to a first angle of incidence of the first light wave,
   wherein the first angle of incidence of the first light wave is relative to the emitter; and
   the undesired light wave has an angle of reflection relative to the detector that corresponds to the first angle of incidence of the first light wave.

4. The optical device of claim 3, wherein:
   the filter property is operable to permit the second light wave to be detected by the detector based on the second light wave having a second angle of reflection; and
   the second angle of reflection of the second light wave is relative to the detector and is different than the first angle of incidence of the first light wave.

5. The optical device of claim 4, wherein:
   the first angle of incidence of the first light wave is greater than 45 degrees relative to a central axis of the emitter; and
   the second angle of reflection of the second light wave is between zero degrees relative to the central axis of the detector and 30 degrees relative to the central axis of the detector.

6. The optical device of claim 1, wherein the filter property of the interference filter is operable to cause the interference filter to attenuate one or more light wave signals that have an angle of reflection relative to the detector that corresponds to the first angle of incidence of the first light wave.

7. The optical device of claim 1, wherein the filter property of the interference filter represents a dynamic angular response of the interference filter.

8. The optical device of claim 7, wherein:
   the dynamic angular response of the interference filter changes based on an angle of incident light; and
   the angle of incident light is relative to a surface of the detector.

9. The optical device of claim 8, wherein the dynamic angular response of the interference filter has a change of approximately −1 nanometer in response to a one degree change to the angle of incident light.

10. The optical device of claim 8, wherein:
    the interference filter is a passband filter with a particular transmission passband; and
    the transmission passband represents a range of wavelengths that are not attenuated by the interference filter.

11. The optical device of claim 10, wherein the passband filter is operable such that the transmission passband spectrally shifts in response to an increase in the angle of incident light.

12. The optical device of claim 1, wherein:
    the interference filter is a passband filter; and
    the optical device is a proximity sensor operable to detect a proximity of a target object relative to the optical device.

13. The optical device of claim 1, wherein the undesired light wave that is based on the first light wave is a result of the first light wave interacting with a portion of an internal cavity of the optical device.

14. The optical device of claim 1, wherein the first light wave and the second light wave have the same wavelength.

15. A method performed using an optical device, the method comprising:
    emitting, by an emitter disposed in the optical device, a first light wave, wherein the first light wave causes an undesired light wave in the optical device;
    detecting, by a detector disposed in the optical device, a second light wave that is based on the first light wave; and
    filtering, using an interference filter disposed on the detector, the undesired light wave caused by the first light wave, wherein filtering the undesired light wave comprises attenuating the undesired light wave based on a filter property of the interference filter,
    wherein the filter property of the interference filter is based on a composition of layers that form the interference filter,
    wherein each layer of the plurality of layers has a thickness;
    wherein the thickness of the each layer of the plurality of layers controls an amount of the undesired light wave that is blocked from detection by the detector.

16. The method of claim 15, further comprising:
    attenuating the undesired light wave based on an angle of reflection of the undesired light wave, the angle of reflection of the undesired light wave being relative to a surface of the detector.

17. The method of claim 15, further comprising:
attenuating the undesired light wave based on the undesired light wave having an angle of reflection that corresponds to a first angle of incidence of the first light wave,
wherein the first angle of incidence of the first light wave is relative to the emitter; and
the undesired light wave has an angle of reflection relative to the detector that corresponds to the first angle of incidence of the first light wave.

18. The method of claim 17, further comprising:
permitting, by the interference filter and based on the filter property, the second light wave to be detected by the detector based on the second light wave having a second angle of reflection,
wherein the second angle of reflection of the second light wave is relative to the detector and is different than the first angle of incidence of the first light wave.

19. A host device comprising an optical device as in claim 1, the host device comprising:
one or more processing devices; and
one or more non-transitory machine-readable storage devices storing instructions that are executable by the one or more processing devices to cause performance of operations comprising:
receiving one or more signals from the detector; and
adjusting a feature of the host device in response to receiving the one or more signals from the detector.

\* \* \* \* \*

UNITED STATES PATENT AND TRADEMARK OFFICE
CERTIFICATE OF CORRECTION

| | | |
|---|---|---|
| PATENT NO. | : 12,038,533 B2 | Page 1 of 1 |
| APPLICATION NO. | : 17/057631 | |
| DATED | : July 16, 2024 | |
| INVENTOR(S) | : Matt Kroese et al. | |

It is certified that error appears in the above-identified patent and that said Letters Patent is hereby corrected as shown below:

On the Title Page

In (60) Related U.S. Application Data
Please add "Provisional application No. 62/676,395, filed on May 25, 2018 and 62/809,849, filed on February 25, 2019"

Signed and Sealed this
Fifth Day of November, 2024

Katherine Kelly Vidal
*Director of the United States Patent and Trademark Office*